March 25, 1958  R. L. MILLER  2,827,645
FRUIT GRADING TABLE AND BRUSHER
Filed May 28, 1956  3 Sheets-Sheet 1
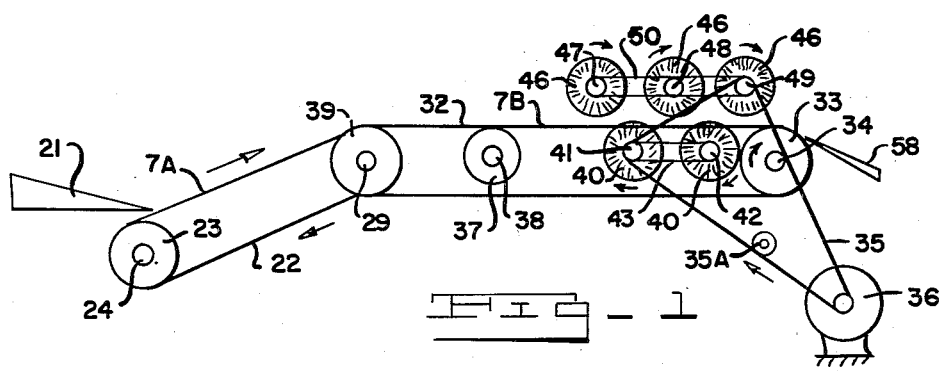
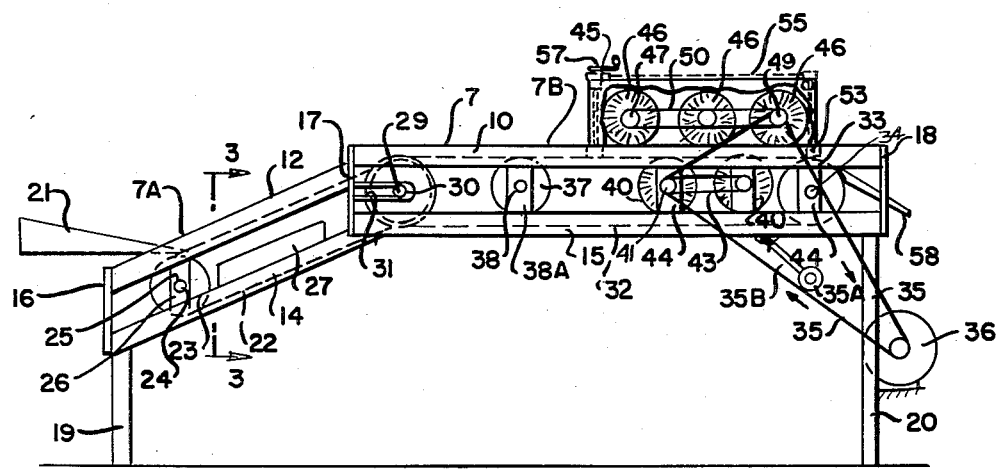
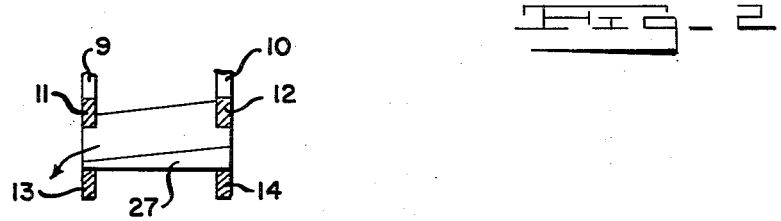
INVENTOR.
RAYMOND L. MILLER
BY
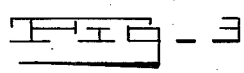
ATTORNEY March 25, 1958  R. L. MILLER  2,827,645
FRUIT GRADING TABLE AND BRUSHER
Filed May 28, 1956  3 Sheets-Sheet 2
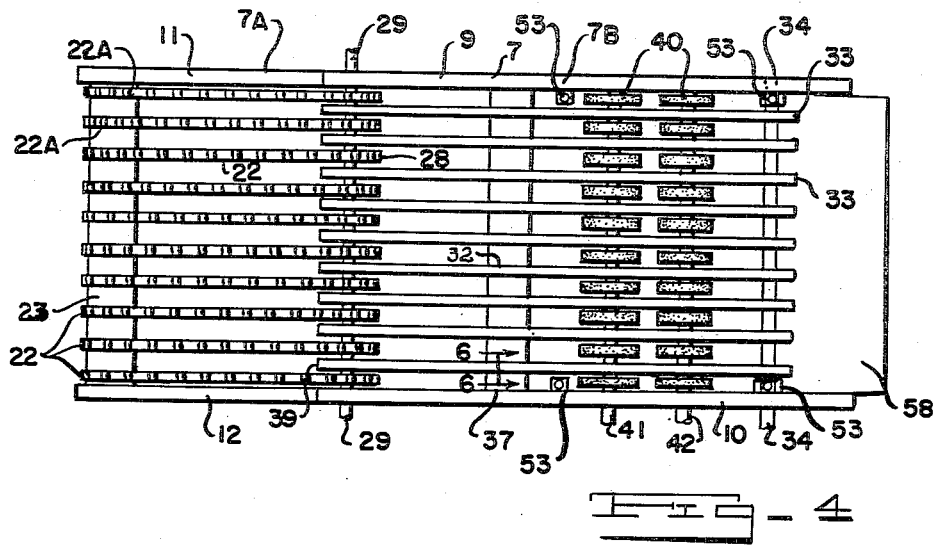
Fig-4
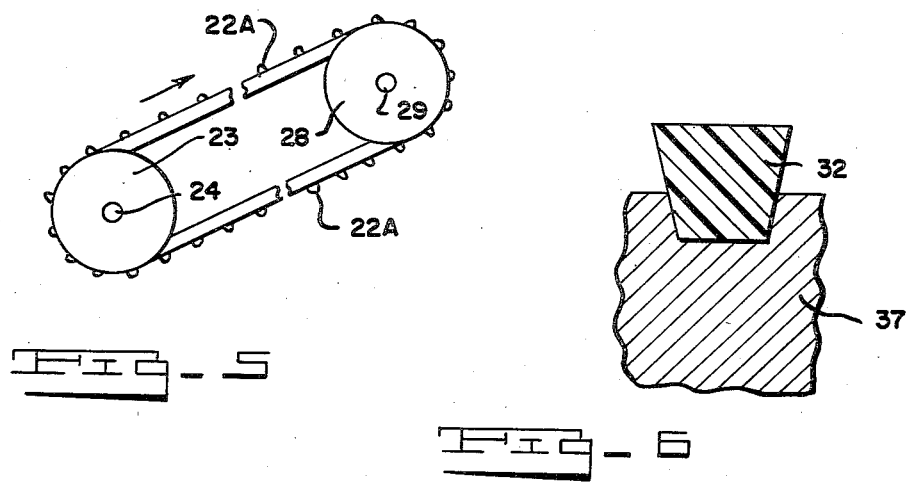
Fig-5
Fig-6
INVENTOR.
RAYMOND L. MILLER
BY
Edward M. Apple
ATTORNEY March 25, 1958     R. L. MILLER     2,827,645
FRUIT GRADING TABLE AND BRUSHER
Filed May 28, 1956     3 Sheets-Sheet 3
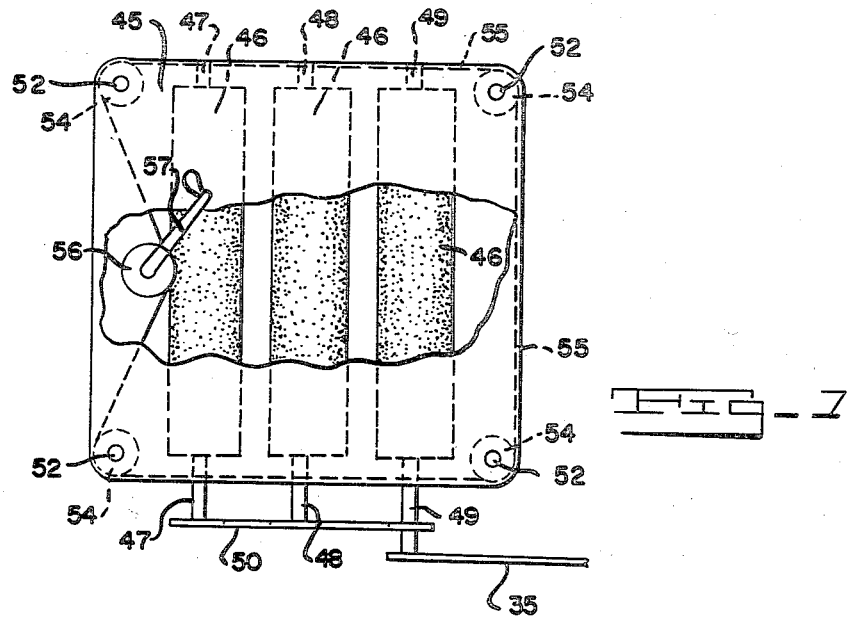
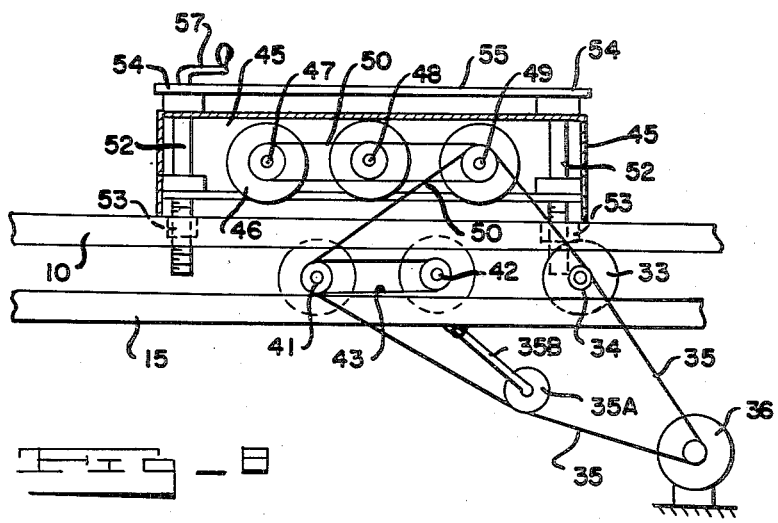
INVENTOR.
RAYMOND L. MILLER
BY
Edward M. Apple
ATTORNEY

United States Patent Office 2,827,645
Patented Mar. 25, 1958

2,827,645

FRUIT GRADING TABLE AND BRUSHER

Raymond L. Miller, Utica, Mich.

Application May 28, 1956, Serial No. 587,835

2 Claims. (Cl. 15—3.11)

This invention relates to fruit handling equipment and has particular reference to a table for grading and brushing apples and other fruit.

An object of the invention is to provide a grading and brushing table which may be used independently, or which may be used in connection with a fruit sizing machine such as disclosed in United States Patent No. 2,699,253, issued to me January 11, 1955.

Another object of the invention is to provide a device of the character indicated which is very compact and which may be operated in a more or less confined space.

Another object of the invention is a provision of the device of the character indicated which may be transported from place to place in an orchard for use in the preliminary sizing of fruit immediately after picking, whereby to save all unnecessary handling of culls.

Another object of the invention is to provide a grading and brushing table which employs a plurality of spaced V-belts as the conveyor, which conveyor operates quietly and efficiently in taking on and transporting the fruit.

Another object of the invention is to provide a device of the character indicated which is constructed and arranged so that the fruit can be brushed on two sides while being transported.

Another object of the invention is to provide a device of the character indicated which is constructed and arranged so that it will not bruise the fruit during the brushing operation as often happens in conventional devices which employ flat brushes or dowels to support the fruit as it is being brushed.

Another object of the invention is to provide a device which is constructed with a plurality of spaced V belts comprising the conveyor, which are arranged so that small fruit and culls together with dirt, leaves and other debris may fall through the belts and be eliminated from further handling.

Another object of the invention is to provide a device of the character indicated which is constructed and arranged with a plurality of spaced belts, which permits the brushing of the fruit in the spaces between the belts, whereby the fruit is more effectively cleaned.

Another object of the invention is to provide a device of the character indicated which permits the fruit to be handled at substantially waist height for easy operation in hand picking of the larger culls and spotted, misshaped, green or worm laden fruit.

The foregoing and other objects and advantages of the invention will become more apparent as the description proceeds, reference being made from time to time to the accompanying drawing, forming part of the within disclosure, in which drawing:

Fig. 1 is a diagrammatic, side elevational view of a device embodying the invention with the supporting structure removed.

Fig. 2 is a side elevational view of the device embodying the invention, including the frame work which supports the moving parts.

Fig. 3 is a vertical section taken substantially on the line 3—3 of Fig. 2.

Fig. 4 is a top plan view of the device illustrated in Fig. 1 with parts broken away and the upper brushes removed.

Fig. 5 is an enlarged side elevational view, with parts removed, illustrating the elevator portion of the device.

Fig. 6 is a section taken substantially on the line 6—6 of Fig. 4.

Fig. 7 is a top plan view with parts broken away, of the upper brush assembly and drive.

Fig. 8 is a side elevational view with parts in section of the upper brush assembly and drive.

Referring now more particularly to the drawings, it will be understood that in the embodiment herein disclosed, the reference character 7 (Figs. 2 and 4) indicates generally the frame work of the table of the device which consists of side rails 9, 10, 11, 12, 13, 14 and 15, and end members 16, 17 and 18, all of which preferably consist of channel or angle iron bars secured together by welding or other suitable means and supported by means of legs 19 and 20, which are also preferably welded to the frame.

The device in general, consists of two sections, an elevator section 7A and a horizontal section 7B, which I will now describe in detail. The elevator section 7A is intended to receive the fruit from the feeding chute 21 (Fig. 1) and transport it upwardly to the horizontal section 7B where the fruit will be graded and brushed.

The section 7A includes a plurality of V-shaped belts 22 which travel over a common, grooved roller 23, which is mounted for rotation with a shaft 24 (Fig. 2) which is mounted in suitable bearing blocks 25, which are provided with adjusting means 26, whereby tension may be put on the belts 22. The belts 22 are preferably standard one-half inch (A-section V-belts) which are spaced approximately one and five-eighths inches from each other so that culls and fruit less than two inches in diameter may fall through the spaces between the belts 22 and be carried off to the side by means of an inclined tray 27, which is mounted on the members 13 and 14 (Fig. 3). The belts 22 are provided with spaced ribs 22A (Figs. 4 and 5) on their outer faces. The belts 22 are inclined upwardly where they pass over the pulleys 28, mounted on a shaft 29, which is supported for rotation in bearing members 30, carried at either side of the horizontal frame section 7B as shown in Fig. 2. The bearing members 30 are adjustable by means 31, so that tension may be adjusted on the V-belts 32, which comprise the conveyor portion of the horizontal section 7B. The V-belts 32 are preferably standard twenty-one thirty-seconds of an inch (B-section V-belts) which are preferably spaced one and one-half inches apart, so that any two of the V-belts 32 may transport between them fruit of approximately two inches or more in diameter. The V-belts 32 also travel over a grooved roller or pulleys 33, which rotate with the shaft 34, which may be driven by a chain 35 (Fig. 1) which in turn is driven by a motor 36. The shaft 34 is the drive shaft, which in turn drives the belts 32 and 22 and their supporting rotatable members. I provide an idler roller 37, which rotates with a shaft 38, for taking up the slack on the horizontal belts 32. The shaft 38 is supported at either end in suitable bearings 38A (Fig. 2) which are supported by the side members 9, 10, etc. This idler roller 37 is grooved to approximately one-half of the depth of the V-belts 32 (Fig. 6) so that the portions of the roller between the belts 32, help to turn the fruit over as it travels along the belts and contacts the idler roller 37.

It will be understood that the pulleys 39 which support the V-belts 32, on the common shaft 29, are smaller in diameter than the pulleys 28 on the same shaft, which support the V-belts 22, so that fruit being elevated on the belts 22 will not be kicked off as it approaches the horizontal belts 32.

The lower brushing section of the device preferably consists of a plurality of rotary brushes 40, which are mounted on common shafts 41 and 42, and rotate therewith, the shafts 41 and 42 being driven by suitable sprockets and a chain 43 (Figs. 1 and 2) which in turn is driven by the common drive chain 35, through the motor 36. The brushes 40 are 7 inches in diameter and approximately one and one-half inches thick, so that they may rotate in the spaces between the belts 32 and contact the fruit being transported by any two adjacent belts. The shafts 41 and 42 are supported at either end in suitable bearing members 44 (Fig. 2).

I will now describe the upper brush assembly Figs. 7 and 8.

Mounted for rotation in a vertically adjustable housing 45 (Figs. 2 and 7) positioned above the V-belts 32 are three elongated rotary brushes 46, which are mounted on shafts 47, 48 and 49, which are driven by a sprocket chain 50. An idler sprocket 35A (Figs. 1, 2 and 8) is mounted on a pivotable arm 35B, and places slight tension on the chain 35, which engages suitable sprockets on the shaft of motor 36, and the shafts 34, 41 and 49. The brushes 46 are intended to contact from the top, the fruit being carried on the V-belts 32.

The brush housing 45 is supported at either corner by means of threaded rods 52 which engage nuts 53 welded to the frame members 9 and 10. The upper end of the threaded rods 52, are provided with sprockets 54, which rotate in a common direction by means of a chain 55, which is driven by a sprocket 56, preferably rotated by a hand crank 57. With this structure, the brushes 46 may be elevated and lowered with respect to the V-belts 32, so that more or less pressure may be exerted on the fruit being transported on the V-belts 32. The fruit which has not fallen through the spaces between the V-belts 22 and 32, and which has not been previously hand picked from the V-belts 32, passes between the brushes 40 and 46, and is thoroughly cleaned of mud or other debris, and after passing through the brushes is dropped to the chute 58, which directs it to a fruit sizing machine, such as disclosed in my previous patent hereinabove disclosed.

It is believed that the operation of the device is obvious from the foregoing description.

Having described my invention, what I claim and desire to secure by Letters Patent is:

1. A grader and brusher for apples comprising in combination, a plurality of spaced endless V-belts having laterally spaced, parallel upper reaches, arranged in slightly inclined position, a plurality of spaced endless V-belts having laterally spaced, parallel upper reaches, positioned in substantially horizontal position, said inclined belts and said horizontal belts being in alternate relation, whereby pairs of said horizontal belts may receive pre-selected apples from pairs of said inclined belts, means to rotatably support said V-belts, and means to drive all of said V-belts in a common direction, there being a plurality of brushes positioned in the spaces between said horizontal V-belts, and arranged to contact the upper and lower surfaces of the apples carried on said horizontal belts and means to rotate said brushes.

2. A grader and brusher for apples comprising in combination, a plurality of spaced endless V-belts having laterally spaced, parallel upper reaches, arranged in slightly inclined position, a plurality of spaced endless V-belts having laterally spaced, parallel upper reaches, positioned in substantially horizontal position, said inclined belts and said horizontal belts being in alternate relation, whereby pairs of said horizontal belts may receive pre-selected apples from pairs of said inclined belts, means to rotatably support said V-belts, and means to drive all of said V-belts in a common direction, there being a plurality of narrow rotatable brushes mounted above and extending into the spaces between said horizontal V-belts, and common means to rotate said brushes, there being common means for adjusting the position of all of said brushes simultaneously with respect to said V-belts.

References Cited in the file of this patent

UNITED STATES PATENTS

| 167,519 | Fowler | Sept. 7, 1875 |
| 976,775 | Borjeson et al. | Nov. 22, 1910 |
| 1,570,409 | Stoppel | Jan. 19, 1926 |
| 1,952,429 | Ghent et al. | Mar. 27, 1934 |
| 2,350,691 | Mauroner | June 6, 1944 |

FOREIGN PATENTS

| 850,127 | Germany | Sept. 22, 1952 |